No. 782,099.  
Patented February 7, 1905.

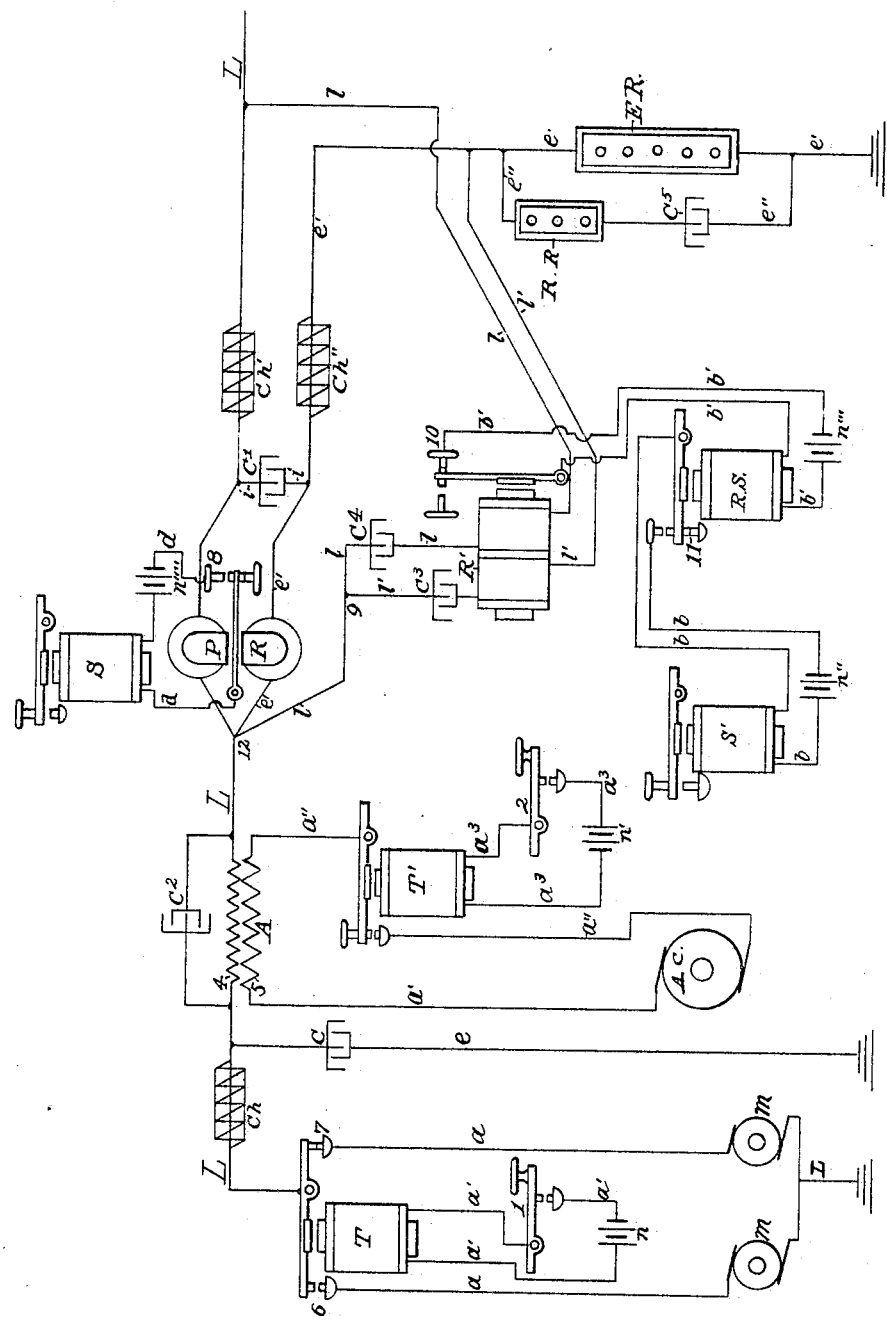

UNITED STATES PATENT OFFICE.

WILLIAM EDWARD ATHEARN, OF BROOKLYN, NEW YORK.

TELEGRAPH SYSTEM.

SPECIFICATION forming part of Letters Patent No. 782,099, dated February 7, 1905.

Application filed June 2, 1902. Serial No. 109,990.

*To all whom it may concern:*

Be it known that I, WILLIAM EDWARD ATHEARN, a citizen of the United States, and a resident of Brooklyn, in the county of Kings and State of New York, have invented a certain new and useful Telegraph System, of which the following is a specification.

This invention relates to electric telegraphs; and its object is the employment of two kinds of currents, the direct and the alternating, for producing a simple quadruplex system. The object is attained by the means set forth in this specification and the accompanying diagram, which represents the main features of equipment for terminal stations.

At the ground end of the line L is a source of current, which may be a battery, a generator or generators, as indicated at $m$ $m$. The leads $a$ $a$ from said current source are connected with the contact-points 6 7 of the transmitter T. A key 1, in circuit through line $a'$ $a'$ $a'$ with the battery $n$ and coil of the transmitter, is employed for sending impulses from the generators to the line. A transformer A is inserted in the line at a point beyond the transmitter T, the secondary 4 of the transformer constituting a part of the line. The primary 5 of the transformers is connected, through $a''$ $a''$ $a''$, with a source of alternating current, which is here shown to be a generator AC, and with the lever and contact-points of the transmitter T'. This transmitter is operated by key 2 through the line $a^3$ $a^3$ $a^3$, which includes a battery $n'$. Between the transformer and the first transmitter a choke or damming coil $Ch$ is inserted in the main line L, and between this damming-coil and the transformer is a line $e$ from the main line to the earth. This ground-line includes a condenser C. Beyond the transformer the main line passes through one of the coils of a polarized relay PR, and a choke-coil $Ch'$ is inserted in the line beyond the relay. A branch $e'$ from the main line passes through the other coil of the polarized relay, through a choke-coil $Ch''$, through the equating-rheostat ER to the earth. This polarized relay actuates the sounder S through the contact-point 8, the line $d$ $d$, and the battery $n''''$. A condenser C' is bridged upon line $i$ $i$ between the main line and the branch line $e'$ between the polarized relay and the damming-coils $Ch'$ $Ch''$.

From the main line between the transformer and the polarized relay a branch-line $l$ is divided and taken to a differential relay R', the main branch $l$ being connected with one winding of the relay, and the second branch $l'$ to the reverse winding of the relay. From the coils of the relay the branch $l$ is continued to the main line L at a point beyond the choke-coil $Ch'$. The second branch $l'$ is connected with the ground-line $e'$ between the choke-coil $Ch''$ and the rheostat ER. Each of the branches $l'$ $l$ includes a condenser $C^3$ $C^4$, respectively, between the point of division 9 and the relay. The relay R' operates the relay-sounder RS through its lever, contact-point 10, line $b'$ $b'$ $b'$, and battery $n'''$, and this sounder actuates the reading-sounder S' through its lever, contact-point 11, line $b$ $b$ $b$, and battery $n''$. Shunting the equating-rheostat ER is a line $e''$, including within it a retarding-rheostat RR and a condenser $C^5$.

The operation of the system is as follows: Manipulation of the key 1 will cause the transmitter T to put current impulses of opposite polarity upon the line L. They will pass through the coil $Ch$, through the secondary of the transformer A, and the branch $e'$ being adjusted to an equal resistance with the line L the current will divide equally at the point 12 on the main line. One half will follow the line to its terminal station, and the other half will go to the earth through the line $e'$. As an equal amount of current passes through each of the coils of the polarized relay, the relay will not be affected by it. Manipulation of key 2 will cause alternating impulses to pass through the transformer A, inducing like impulses upon the main line. The impedance to the passage of these impulses offered by the coil $Ch$ will cause the alternations to find a path upon the earth-line $e$, the condenser C offering little or no resistance to them. The impedance of the coils $Ch'$ $Ch''$ beyond the polarized relay will divert these currents to the easier paths of the branches $l$ $l'$, one portion of the current going upon the line $l$, through the relay, to the main line, the other portion going upon the line $l'$, through the relay, to the earth-line $e'$, the condenser $C^5$ and lesser resistance of RR affording the current a preferable path around the greater impedance of ER. The passage of these impulses through the relay will have no effect upon it, since the windings of $l'$ is opposed to that of $l$.

It is to be borne in mind that the Morse characters spoken of herein as "impulses" are not composed of alternating impulses of a certain or given polarity, but that each character is made up of a number of "cycles," dependent upon the speed of the generator.

Incoming signals will find paths as follows: A direct current coming in upon the main line L will pass through the coil $Ch'$, through the magnet P of the polarized relay, and will cause a response of the relay-lever and consequent action of the sounder S. It will pass on through the coil 4 of the transformer, will not go to earth through the line $e$ because of the condenser C, will go through the coil $Ch$, through the transmitter-lever and one of its contacts, through the line $a$, generator $m$, and to the ground. Alternating-current signals coming in upon the line will be diverted by the coil $Ch'$ to the line $l$, will pass through the relay R', causing movement of its lever and consequent action of the sounders RS and S'. The current will divide at the point 9, part of it returning, through the relay, upon the line $l'$, increasing its first effect upon the relay-magnet, the balance of the current finding a path through the line-condenser $C^2$ and C and the circuit $e$ to the ground. Under some conditions a sufficient amount of the incoming alternating current might penetrate the coil $Ch'$ to affect the polarized relay. By means of the bridging-line $i\ i$ and the condenser C' the possibility of operating this relay is avoided, as the current would divide itself between the two coils of the relay.

The direct-current and alternating-current signals are non-interfering with one another, and the instruments thus adapted to be affected by one kind of impulse will not respond to the others.

It will be observed that this is practically a duplex system converted into a quadruplex by the addition of the alternating-current features described.

I claim—

1. In a quadruplex telegraph system the combination with a main line of a source of direct current and such current-transmitting devices, a damming-coil contiguous to said devices, a ground-line including a condenser adjacent to said coil, a transformer with its secondary included in the main line adjacent to the said ground-line, a source of alternating current and devices for transmitting said current impulses through the transformer, a polarized relay with a translating-sounder next the transformer with one of its coils included in the main line with a damming-coil adjacent to it, a branch from the main line passing through the other coil of the polarized relay and extending to the ground embracing a damming-coil and an equating-rheostat, another branch from the main line back of the polarized relay said branch subdivided and passing through a differential relay connected with translating-sounders, one of its branches united to the main line beyond the last damming-coil, the other branch united to the ground-line from the polarized relay, a shunt around the equating-rheostat embracing a retarding-rheostat and a condenser, and a bridge including a condenser uniting the branches from the polarized relay, all substantially as set forth.

2. The combination with a main line and the devices for duplex transmission substantially as herein shown of means for quadruplexing the system comprising a transformer with its secondary in the line, means for sending Morse signals through the transformer from an alternating-current source, a differential relay having a double circuit from the main line with condensers in said circuits, one of said circuits united to the main line beyond the last damming-coil in the line, and the other circuit united to the duplexing ground-line between the choke-coil and rheostat in said line, a condenser shunted around the transformer, a condenser in a ground-line adjacent to the transformer, a damming-coil between said ground-line and the duplex transmitter, damming-coils in the main line and duplex ground-line beyond the polarized relay, and a condenser bridged between the main line and duplex ground-line adjacent to the polarized relay, substantially as set forth.

Signed at New York, in the county of New York and State of New York, this 23d day of May, A. D. 1902.

WILLIAM EDWARD ATHEARN.

Witnesses:
JOHN C. SANDERS,
ROBT. H. MORRIS.